(12) United States Patent
Kumano

(10) Patent No.: US 9,848,066 B2
(45) Date of Patent: Dec. 19, 2017

(54) COMMUNICATION RECORDING APPARATUS, SYSTEM AND METHOD

(71) Applicant: FUJITSU LIMITED, Kawasaki-shi, Kanagawa (JP)

(72) Inventor: Tatsuo Kumano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 15/012,899

(22) Filed: Feb. 2, 2016

(65) Prior Publication Data

US 2016/0227001 A1    Aug. 4, 2016

(30) Foreign Application Priority Data

Feb. 3, 2015   (JP) ................................ 2015-019091

(51) Int. Cl.
| | | |
|---|---|---|
| H04L 29/06 | (2006.01) | |
| H04L 12/811 | (2013.01) | |
| H04L 12/741 | (2013.01) | |

(52) U.S. Cl.
CPC .............. *H04L 69/04* (2013.01); *H04L 47/38* (2013.01); *H04L 45/74* (2013.01)

(58) Field of Classification Search
CPC ..... H04L 45/74; H04L 29/0604; H04L 47/38; H04L 69/04; H04B 1/66; H03M 7/30
See application file for complete search history.

(56) References Cited

U.S. PATENT DOCUMENTS

| 5,768,525 A * | 6/1998 | Kralowetz | H04L 29/06 370/401 |
|---|---|---|---|
| 7,420,992 B1* | 9/2008 | Fang | H04L 12/4633 370/477 |
| 8,417,833 B1* | 4/2013 | Amdahl | H04L 69/04 370/389 |
| 2002/0097172 A1* | 7/2002 | Fallon | G06T 9/00 341/51 |
| 2004/0114634 A1* | 6/2004 | Liu | H04L 63/045 370/521 |
| 2009/0067440 A1* | 3/2009 | Chadda | H04L 63/0227 370/401 |
| 2010/0121972 A1* | 5/2010 | Samuels | H04L 41/082 709/231 |
| 2010/0241694 A1* | 9/2010 | Jensen | H04L 69/24 709/203 |
| 2011/0037626 A1* | 2/2011 | Fallon | G06T 9/00 341/87 |
| 2012/0039332 A1* | 2/2012 | Jackowski | H04L 69/32 370/389 |
| 2013/0077486 A1* | 3/2013 | Keith | H04L 47/2433 370/230.1 |

(Continued)

FOREIGN PATENT DOCUMENTS

JP    2001-111432    4/2001

*Primary Examiner* — Warner Wong
(74) *Attorney, Agent, or Firm* — Fujitsu Patent Center

(57) ABSTRACT

A communication recording apparatus includes: a storage unit and a computational unit. The storage unit stores packets transmitted from a transmitter apparatus to a destination apparatus. The computational unit executes a process including deciding, in accordance with a port number included in the received packets, whether the packets are to be compressed, compressing the packets decided to be compressed, and storing the compressed packets in the storage unit.

10 Claims, 18 Drawing Sheets

(56) References Cited

U.S. PATENT DOCUMENTS

2014/0064180 A1* 3/2014 Kotecha .................. H04L 69/04
370/328
2015/0035938 A1* 2/2015 Emori ................... H04M 3/567
348/14.08
2015/0319269 A1* 11/2015 Jensen .................... H04L 69/24
709/203

* cited by examiner

| COMPRESSION RATIO MANAGEMENT TABLE | | | |
|---|---|---|---|
| PROTOCOL | PORT NUMBER | PRE-COMPRESSION SIZE | POST-COMPRESSION SIZE |
| TCP | 21 | 1 GB | 200 MB |
| TCP | 22 | 3 GB | 3 GB |
| TCP | 80 | 1 GB | 400 MB |
| TCP | 443 | 1 GB | 980 MB |
| ... | ... | ... | ... |

FIG. 6

| COMPRESSION CONTROL TABLE | | |
| --- | --- | --- |
| PROPORTION TO DATA TO BE COMPRESSED (FIRST THRESHOLD) | COMPRESSION RATIO THRESHOLD (SECOND THRESHOLD) | RANDOM COMPRESSION PROPORTION |
| 10% | 50% | 1% |

FIG. 8

| COMPRESSION RATIO ADJUSTMENT TABLE | | |
|---|---|---|
| ADJUSTMENT INTERVAL | REDUCTION RATIO FOR TOTAL PRE-COMPRESSION SIZE | REDUCTION RATIO FOR COMPRESSION RATIO |
| 1 HOUR | 90% | 90% |

EXAMPLE OF DECAY CAUSED IN COMPRESSION RATIO

| ELAPSED TIME | PRE-COMPRESSION SIZE | POST-COMPRESSION SIZE | COMPRESSION RATIO |
| --- | --- | --- | --- |
| 0 | 100 | 80 | 20% |
| 1 | 90 | 74 | 18% |
| 2 | 81 | 68 | 16% |
| 3 | 73 | 62 | 15% |
| 4 | 66 | 57 | 13% |
| 5 | 59 | 52 | 12% |
| 6 | 53 | 47 | 11% |
| 7 | 48 | 43 | 10% |
| 8 | 43 | 39 | 9% |
| 9 | 39 | 36 | 8% |
| 10 | 35 | 32 | 7% |
| 11 | 31 | 29 | 6% |
| 12 | 28 | 27 | 6% |

FIG. 13

| COMPRESSION RATIO MANAGEMENT TABLE | | | | |
|---|---|---|---|---|
| PROTOCOL | PORT NUMBER | DESTINATION IP ADDRESS | PRE-COMPRESSION SIZE | POST-COMPRESSION SIZE |
| TCP | 80 | 192.168.1.100 | 100 MB | 20 MB |
| TCP | 80 | 192.168.2.30 | 1 GB | 700 MB |
| ... | ... | ... | ... | ... |

| COMPRESSION RATIO MANAGEMENT TABLE | | | | |
| --- | --- | --- | --- | --- |
| PROTOCOL | PORT NUMBER | FILE TYPE | PRE-COMPRESSION SIZE | POST-COMPRESSION SIZE |
| TCP | 80 | video/mpeg | 100 GB | 97 GB |
| TCP | 80 | test/html | 10 GB | 500 MB |
| TCP | 21 | .txt | 1 GB | 100 MB |
| TCP | 21 | .avi | 10 GB | 9 GB |
| TCP | 22 | UNCLEAR | 2 GB | 1.8 GB |
| ... | ... | ... | ... | ... |

COMPRESSION RATIO MANAGEMENT TABLE 111c

| PROTOCOL | PORT NUMBER | 00:00 TO 00:59 | | 01:00 TO 01:59 | | 02:00 TO 02:59 | | ... |
|---|---|---|---|---|---|---|---|---|
| | | PRE-COMPRESSION SIZE | POST-COMPRESSION SIZE | PRE-COMPRESSION SIZE | POST-COMPRESSION SIZE | PRE-COMPRESSION SIZE | POST-COMPRESSION SIZE | |
| TCP | 21 | 200 MB | 40 MB | 100 MB | 30 MB | 100 MB | 25 MB | ... |
| TCP | 22 | 2 GB | 2 GB | 1 GB | 990 MB | 500 MB | 500 MB | ... |
| ... | ... | ... | ... | ... | ... | ... | ... | ... |

COMMUNICATION RECORDING APPARATUS, SYSTEM AND METHOD

CROSS-REFERENCE TO RELATED APPLICATION

This application is based upon and claims the benefit of priority of the prior Japanese Patent Application No. 2015-019091, filed on Feb. 3, 2015, the entire contents of which are incorporated herein by reference.

FIELD

The present embodiments discussed herein are related to a communication recording apparatus, a communication recording system, and a communication recording method.

BACKGROUND

Information processing systems that include various apparatuses are presently in use. The apparatuses in such systems are interconnected via networks, predetermined cables, and the like so as to communicate with each other. TCP (Transmission Control Protocol)/IP (Internet Protocol) is one example of a protocol for transferring data in packets on a network.

The size of data and the amount of data to be transmitted in such a system can be reduced by compressing the communicated data. As one example, for a system where a personal computer and a printer can be connected via various types of communication interface, a method that selects whether to compress data transmitted to the printer has been proposed. According to this method, the personal computer decides whether to transmit compressed or uncompressed print data to the printer in accordance with the communication speed of a communication interface (i.e., data is compressed when low-speed communication is used). With this method, it would also be conceivable to compress the data to be transmitted, to acquire the compression ratio, and then decide whether to transmit the data compressed or uncompressed according to the communication speed of the communication interface and the compression ratio of the data.

See, for example, the following document: Japanese Laid-Open Patent Publication No. 2001-111432.

When managing system operations, it can be useful to have a communication monitoring apparatus collect and store the packets transferred between apparatuses. As one example, when a communication breakdown has occurred, the collected packets can be used to analyze the cause and/or what measures are to be taken. However, the amount of packets to be collected is huge and can easily exceed the capacity of a storage apparatus. It is possible to reduce the stored amount of data by compressing the collected packets, but this creates a further problem of the load of the compression processing.

As described above, the transmitted packets include both compressed and uncompressed packets. For packets that have already been compressed, further compression achieves little reduction in data size. The reduction in data size achieved by compression also varies from large to small depending on the type of data in the packets. Subjecting every packet, including packets for which compression achieves little reduction in size, to data compression increases the load of the compression processing and is inefficient. Also, if the load of the apparatus that collects packets increases, there is the risk that some packets may be dropped.

SUMMARY

According to one aspect, there is provided a communication recording apparatus including: a memory that stores packets transmitted from a transmitter apparatus to a destination apparatus; and a processor that executes a process including deciding, in accordance with a port number included in the received packets, whether the packets are to be compressed, compressing the packets decided to be compressed, and storing the compressed packets in the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 depicts an example of a compression ratio management table;
FIG. 8 depicts an example of a compression control table;
FIG. 9 depicts an example of a compression ratio adjustment table;
FIG. 13 depicts an example where decay is caused in a compression ratio;
FIG. 14 depicts another example ("first alternative example") of a compression ratio management table;
FIG. 15 depicts yet another example ("second alternative example") of a compression ratio management table;
FIG. 16 depicts an example of a compression ratio management table according to a third embodiment.

DESCRIPTION OF EMBODIMENTS

Figure 1:
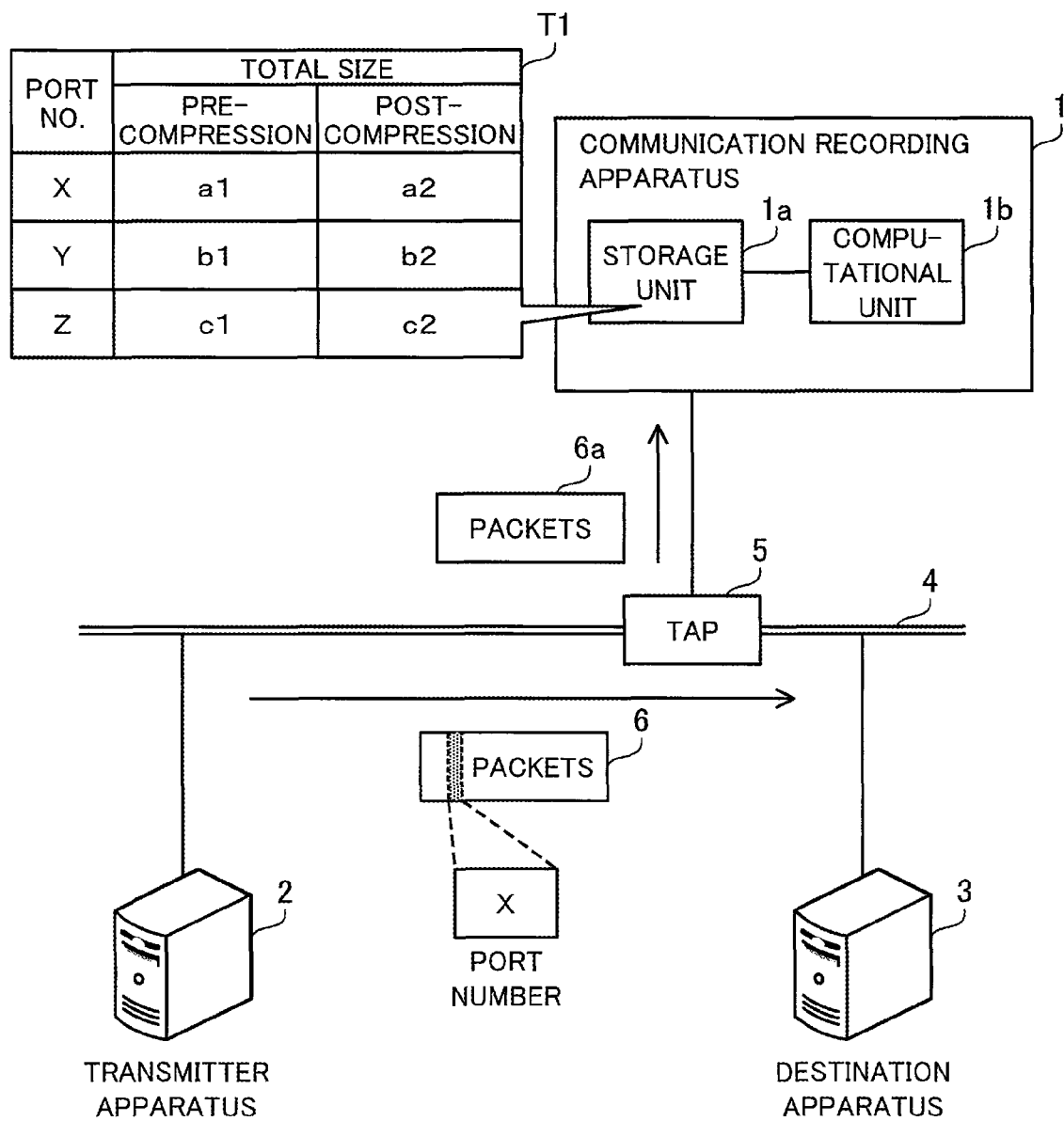
FIG. 1 depicts a communication recording apparatus according to a first embodiment.

Several embodiments will be described below with reference to the accompanying drawings, wherein like reference numerals refer to like elements throughout.

First Embodiment

FIG. 1 depicts a communication recording apparatus according to a first embodiment. The system illustrated in this first embodiment includes a communication recording apparatus 1, a transmitter apparatus 2, and a destination apparatus 3. The transmitter apparatus 2 and the destination apparatus 3 are connected by a network 4. The communication recording apparatus 1, the transmitter apparatus 2, and the destination apparatus 3 use TCP/IP as the communication protocol.

The network 4 is equipped with a tap 5 on a communication path between the transmitter apparatus 2 and the destination apparatus 3. The communication recording apparatus 1 is connected to the tap 5. The tap 5 transfers packets 6 transmitted from the transmitter apparatus 2 to the destination apparatus 3 toward the destination apparatus 3.

Each packet 6 includes information on a port number. The port number is information included in a TCP header or UDP (User Datagram Protocol) header in the packet 6. The port number is used to identify a transmitter or destination application program on the fourth level (transport level) of an OSI (Open Systems Interconnection) reference model.

The tap 5 generates packets 6a by copying the packets 6 and transmits the packets 6a toward the communication recording apparatus 1. Since the packets 6a are copies of the packets 6, the same information as the packets 6 is included. The communication recording apparatus 1 stores the packets 6a received from the tap 5. By doing so, the communication recording apparatus 1 records the content of communication between the transmitter apparatus 2 and the destination apparatus 3.

The communication recording apparatus 1 includes a storage unit 1a and a computational unit 1b. For example, the storage unit 1a is a nonvolatile storage apparatus such as an HDD (Hard Disk Drive) or a flash memory. The storage unit 1a may be a volatile storage apparatus such as RAM (Random Access Memory). The computational unit 1b may include a CPU (Central Processing Unit), a DSP (Digital Signal Processor), an ASIC (Application Specific Integrated Circuit), an FPGA (Field Programmable Gate Array), and the like. The computational unit 1b may be a processor that executes a program. The expression "processor" here may include a group of a plurality of processors, i.e., a so-called "multiprocessor".

The storage unit 1a stores the packets 6a. The packets 6a are stored in the storage unit 1a having been compressed by the computational unit 1b.

The computational unit 1b decides, in accordance with the port number included in the received packets 6a, whether the received packets 6a are to be compressed. The computational unit 1b compresses packets 6a to be compressed and stores the result in the storage unit 1a. The computational unit 1b may compress individual packets or collectively compress a plurality of packets in units of sessions. A session is a unit for identifying communication according to a combination of information such as an address and a port number inside packets. The computational unit 1b stores the packets 6a not to be compressed in the storage unit 1a without compressing the packets 6a.

As mentioned earlier, the port number corresponds to an application program. A variety of application programs exist, such as programs, like Telnet or HTTP (Hypertext Transfer Protocol) programs, that handle plaintext data and programs, like SSH (Secure SHell) and HTTPS (HTTP over TLS/SSL (Transport Layer Security/Secure Sockets Layer) programs, that handle encrypted data. Programs that handle plaintext include programs that mainly handle data in text format, such as Telnet, and programs that handle data such as images and video, such as HTTP.

That is, based on the destination application program, it is possible to make distinctions such as whether the data that has been packetized is encrypted data or plaintext data, or is text data in plaintext format. As one example, compressing non-encrypted data has a larger effect in reducing data size than compressing encrypted data. Compressing data in text format also has a larger effect in reducing data size than compressing data in other formats.

When the packets 6a include a port number (such as "23" corresponding to Telnet) corresponding to an application program for which compression is expected to have a comparatively large effect in reducing the data size, the computational unit 1b decides to compress the packets 6a. On the other hand, when the packets 6a include a port number (such as "22" corresponding to SSH) corresponding to an application program for which compression is expected to have a comparatively small effect in reducing the data size, the computational unit 1b decides to not compress the packets 6a.

Here, when every packet is compressed, there is the risk of the communication recording apparatus 1 having a high load due to the load of the compression processing. Compression processing has a heavy load compared to other processing, and since the communication recording apparatus 1 collects a large amount of packets, the collection process itself has a heavy load. When the load of the communication recording apparatus 1 becomes high, there is the risk that it will not be possible to buffer arriving packets at the communication recording apparatus 1, resulting in packets being discarded (or "dropped"). On the other hand, if no compression is performed at all, it becomes necessary to provide a large storage capacity in keeping with the amount of packets to be collected.

By deciding whether to compress the collected packets 6a in accordance with the port number included in the packets 6a, the communication recording apparatus 1 compresses packets with a high compression ratio and leaves packets with a poor compression ratio uncompressed, because compressing packets with a poor compression ratio would contribute little to saving storage capacity. By operating in this way, it is possible to efficiently reduce the load of the compression processing. As a result, the load of the communication recording apparatus 1 is reduced and it is possible to save on the storage capacity used to store packets while avoiding the dropping of packets.

In addition, with application programs that transfer data in a variety of formats, such as FTP (File Transfer Protocol) and HTTP, and application programs corresponding to port numbers aside from well-known ports, the format of the data being handled can be unclear. For this reason, the communication recording apparatus 1 may keep a record of the amount of data reduced by compression for each port number and may decide whether to compress packets for each port number based on such compression records.

As one example, the computational unit 1b generates a table T1 as a collection/compression record for packets in a given period. In the table T1, port numbers are recorded in association with the total of the pre-compression size of packets and the total of the post-compression size. As one example, the table T1 includes information where the port number is "X", the total pre-compression size is "a1", and the total post-compression size is "a2", information where the port number is "Y", the total pre-compression size is "b1", and the total post-compression size is "ab", and information where the port number is "Z", the total pre-compression size is "c1", and the total post-compression size is "c2".

On receiving packets 6a including the port number "X", the computational unit 1b may decide to compress and then store the packets 6a based on the table T1. More specifically, the computational unit 1b compresses the packets 6a when the proportion of the reduction in size achieved by compression, which equals (total pre-compression size−total post-compression size)/total pre-compression size or "(a1−a2)/(a1)", is equal to or greater than a threshold. The computational unit 1b decides to leave the packets 6a uncompressed when the proportion of the reduction in size achieved by compression is below the threshold.

In this way, the communication recording apparatus 1 is capable of efficiently reducing the load of the compression processing by performing compression which is limited to packets where the compression efficiency is high, based on the compression record for each port number. It is also possible to select whether to perform compression for each port number by following a trend of the data format presently being used. That is, it is possible to cope with a situation where the communicated content for the same port number changes according to time zones, such as the time of day.

Note that this first embodiment is an example where a tap 5 is used. However, in place of the tap 5, it is also possible to use a switch equipped with a port mirroring function, that is, a function that copies the packets transferred using a given communication interface and transmits from a communication interface for monitoring purposes connected to the communication recording apparatus 1. Also, the storage apparatus that stores the packets collected by the communication recording apparatus 1 may be externally attached to the communication recording apparatus 1.

Second Embodiment

Figure 2:
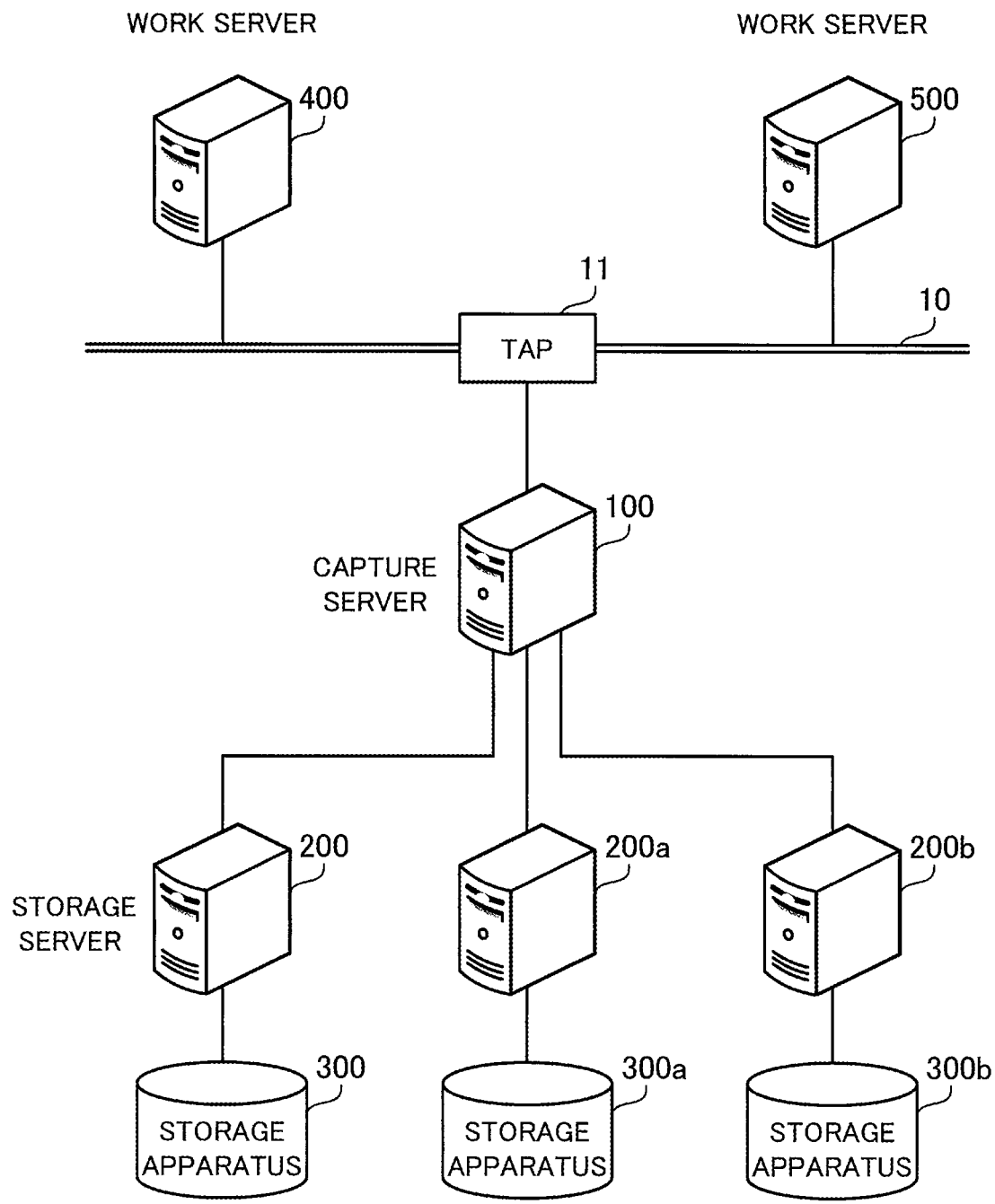
FIG. 2 depicts a communication recording system according to a second embodiment.

FIG. 2 depicts a communication recording system according to a second embodiment. The communication recording system according to the second embodiment includes a capture server 100 and storage servers 200, 200a, and 200b. The capture server 100 is connected via predetermined cables to the storage servers 200, 200a, and 200b. The capture server 100 may be connected to the storage servers 200, 200a, and 200b via a switch.

The storage server 200 is connected to a storage apparatus 300, the storage server 200a is connected to a storage apparatus 300a, and the storage server 200b is connected to a storage apparatus 300b.

The communication recording system according to the second embodiment collects and stores packets via a network 10. The network 10 is formed by connecting a plurality of relay apparatuses using predetermined cables. The network 10 is a LAN (Local Area Network), for example. The network 10 may be a SAN (Storage Area Network) to which server computers and storage apparatuses are connected.

Work servers 400 and 500 are connected to the network 10. The work servers 400 and 500 communicate with each other, are server computers that execute work processing, and function as Web servers, application servers, database servers, or the like. Various server computers aside from the work servers 400 and 500 may be connected to the network 10. Client computers that communicate with server computers such as the work servers 400 and 500 may also be connected to the network 10. In this second embodiment, TCP/IP is used for communication.

The network 10 includes a tap 11 to which the capture server 100 is connected. The tap 11 copies packets transmitted and received via the network 10 and transmits the copies to the capture server 100.

The capture server 100 is a server computer that collects packets transmitted and received via the network 10. The collecting of packets is also referred to as "packet capture" or simply "capture". The capture server 100 sorts a plurality of packets that have been collected into session units to produce a group of data of a predetermined size associated with a session. A session is identified using information of an IP header or a TCP/UDP header included in a packet, described later. The capture server 100 adds metadata to the data that has been sorted and assigns the data to the storage servers 200, 200a, and 200b. The metadata is appended information that facilitates extraction of data including specific information when the collected data is subsequently analyzed. The capture server 100 may also perform data compression.

The storage servers 200, 200a, and 200b are server computers that store data assigned by the capture server 100 in the respective storage apparatuses 300, 300a, and 300b.

Note that the storage apparatus 300 may be externally attached to or incorporated in the storage server 200, the storage apparatus 300a may be externally attached to or incorporated in the storage server 200a, and the storage apparatus 300b may be externally attached to or incorporated in the storage server 200b.

Figure 3:
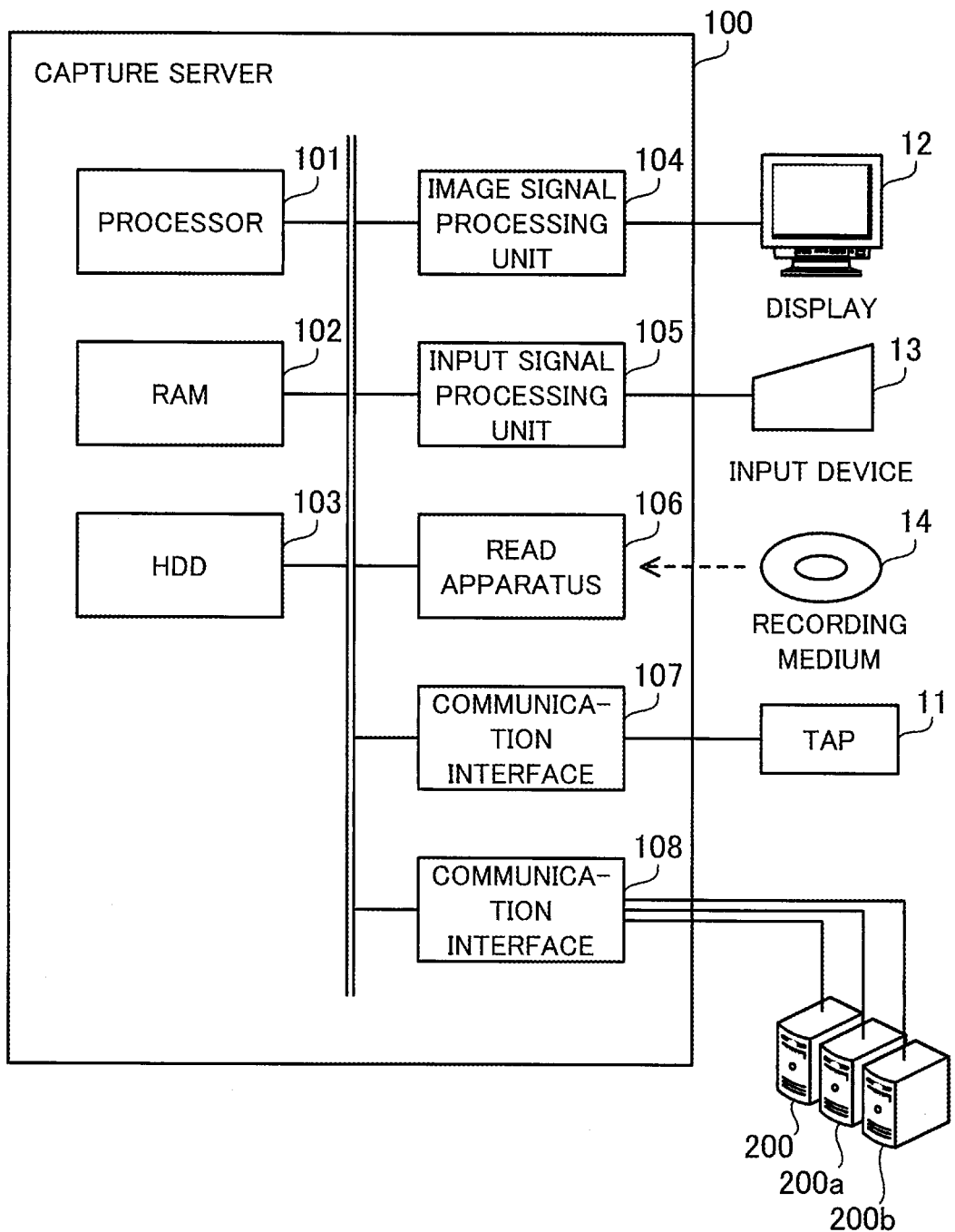
FIG. 3 depicts example hardware of a capture server.

FIG. 3 depicts example hardware of a capture server. The capture server 100 includes a processor 101, a RAM 102, an HDD 103, an image signal processing unit 104, an input signal processing unit 105, a read apparatus 106, and communication interfaces 107 and 108. The respective units are connected to a bus of the capture server 100. The storage servers 200, 200a, and 200b and the work servers 400 and 500 can be realized by the same units as the capture server 100.

The processor 101 controls information processing by the capture server 100. The processor 101 may be a multiprocessor. As examples, the processor 101 may be a CPU, a DSP, an ASIC, or an FPGA, or a combination of two or more of a CPU, a DSP, an ASIC, and an FPGA.

The RAM 102 is a main storage apparatus of the capture server 100. The RAM 102 temporarily stores at least part of an OS (operating system) program and an application program executed by the processor 101. The RAM 102 also stores various data used in processing by the processor 101.

The HDD 103 is an auxiliary storage apparatus of the capture server 100. The HDD 103 magnetically reads and writes data from and onto internally housed magnetic disks. OS programs, application programs, and various data are stored in the HDD 103. The capture server 100 may be equipped with another type of auxiliary storage apparatus, such as flash memory or an SSD (Solid State Drive), or may be equipped with a plurality of auxiliary storage apparatuses.

The image signal processing unit 104 outputs images to a display 12 connected to the capture server 100 in accordance with instructions from the processor 101. As the display 12, it is possible to use a cathode ray tube (CRT) display, a liquid crystal display, or the like.

The input signal processing unit 105 acquires an input signal from an input device 13 connected to the capture server 100 and outputs to the processor 101. As examples of the input device 13, it is possible to use a pointing device, such as a mouse or a touch panel, or a keyboard.

The read apparatus 106 reads programs and data recorded on a recording medium 14. As examples of the recording medium 14, it is possible to use a magnetic disk such as a flexible disk or an HDD, an optical disc such as a compact disc (CD) or a digital versatile disc (DVD), or a magneto-optical (MO) disk. As another example, it is also possible to use a nonvolatile semiconductor memory, such as a flash memory card, as the recording medium 14. In accordance with an instruction from the processor 101, for example, the read apparatus 106 stores a program or data read from the recording medium 14 in the RAM 102 or the HDD 103.

The communication interface 107 receives packets from the tap 11. The communication interface 108 communicates with the storage servers 200, 200*a*, and 200*b* using predetermined cables. The communication interface 108 may be connected to a switch by a predetermined cable. That is, the communication interface 108 may be connected via a switch to the storage servers 200, 200*a*, and 200*b*.

Figure 4:
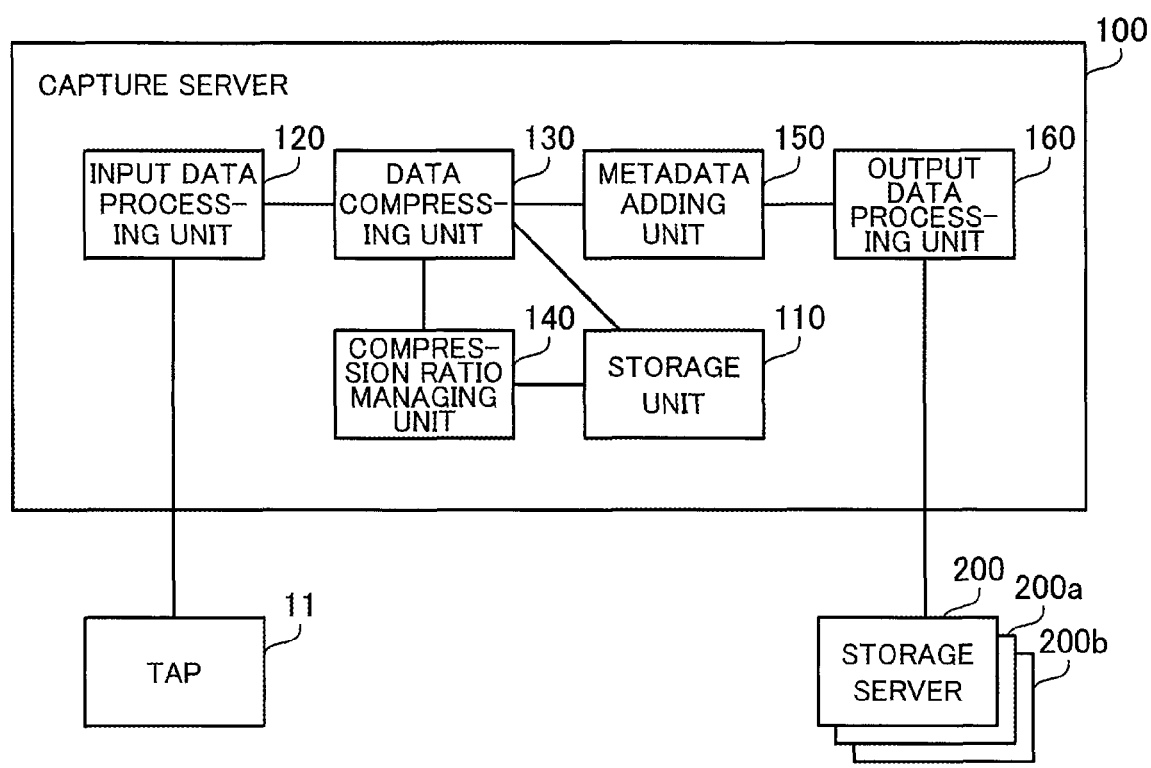
FIG. 4 depicts example functions of the capture server.

FIG. 4 depicts example functions of the capture server. The capture server 100 includes a storage unit 110, an input data processing unit 120, a data compressing unit 130, a compression ratio managing unit 140, a metadata adding unit 150, and an output data processing unit 160. The storage unit 110 is realized as a storage region reserved in the RAM 102 and/or the HDD 103. The input data processing unit 120, the data compressing unit 130, the compression ratio managing unit 140, the metadata adding unit 150, and the output data processing unit 160 are realized by the processor 101 executing a program stored in the RAM 102 or the like.

The storage unit 110 stores information for controlling whether to compress data. The information stored in the storage unit 110 includes a table for managing compression records for data compression performed by the data compressing unit 130.

The input data processing unit 120 sorts a plurality of packets received from the tap 11 into sessions. A session is identified according to a combination of a protocol included in the IP header of a packet, the IP address(es) of the transmitter and/or receiver, and the port number(s) of the transmitter and/or receiver included in the TCP/UDP header. The input data processing unit 120 generates data (data joining a plurality of packets) in which the received plurality of packets are gathered into a predetermined size for each session.

The data compressing unit 130 enquires to the compression ratio managing unit 140 about the compression ratio when the data generated by the input data processing unit 120 is compressed. When making an enquiry, the data compressing unit 130 notifies the compression ratio managing unit 140 of the session information of the data. The data compressing unit 130 decides whether to compress the data in accordance with the compression ratio received in reply from the compression ratio managing unit 140. On deciding to compress the data, the data compressing unit 130 compresses the data. On deciding to not compress the data, the data compressing unit 130 leaves the data uncompressed.

The compression ratio managing unit 140 manages records on data compression by the data compressing unit 130 for each port number. When compression processing has been performed by the data compressing unit 130, the compression ratio managing unit 140 acquires the session ID of the data that has been compressed, the pre-compression data size, and the post-compression data size from the data compressing unit 130. The compression ratio managing unit 140 records the acquired information associated with the port number in a predetermined table stored in the storage unit 110. On receiving an enquiry into a compression ratio by the data compressing unit 130, the compression ratio managing unit 140 sends the compression ratio for each port number in reply based on the table of compression records.

The metadata adding unit 150 adds metadata to the data (which may be compressed or uncompressed) acquired from the data compressing unit 130 to generate output data. As examples, the metadata is information for specifying the IP address(es) of the transmitter and/or receiver and the port number(s) of the transmitter and/or receiver.

The output data processing unit 160 assigns and transmits the output data to the storage servers 200, 200*a*, and 200*b*. As one example, the output data processing unit 160 assigns to the servers 200, 200*a*, and 200*b* in accordance with the metadata included in the output data. The output data processing unit 160 may assign output data including the same metadata to the same storage server.

The storage servers 200, 200*a*, and 200*b* store the data received from the capture server 100 in the storage apparatuses 300, 300*a*, and 300*b*. The storage servers 200, 200*a*, and 200*b* may scan the data for viruses before storing in the storage apparatuses 300, 300*a*, and 300*b*.

Figure 5A:
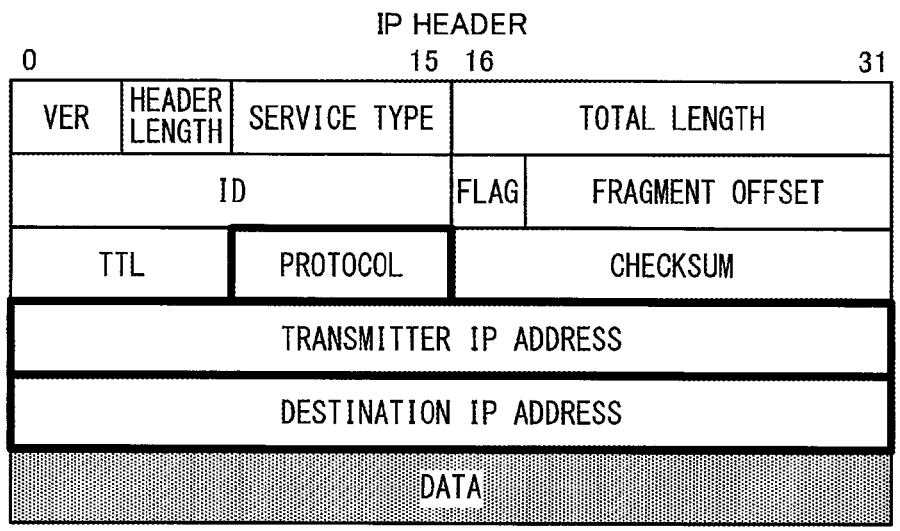
FIGS. 5A to 5C depict examples of headers included in packets.
Figure 5B:
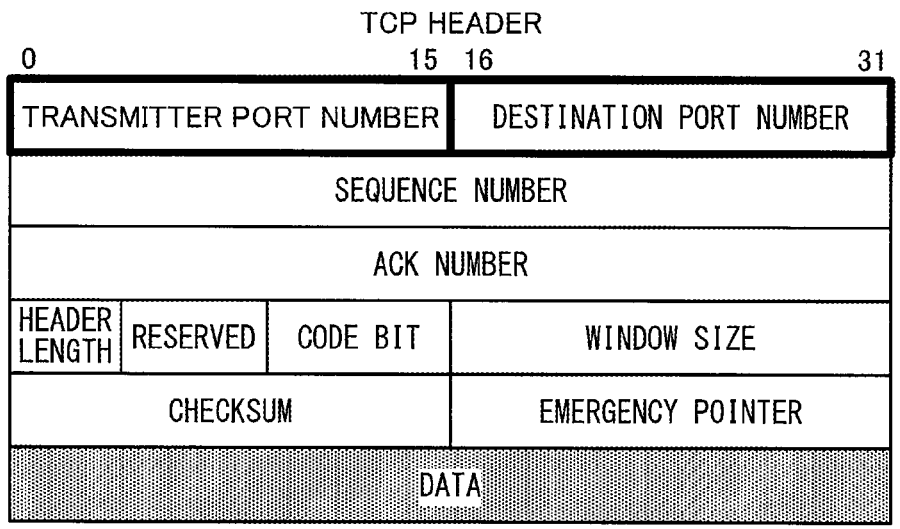
Figure 5C:
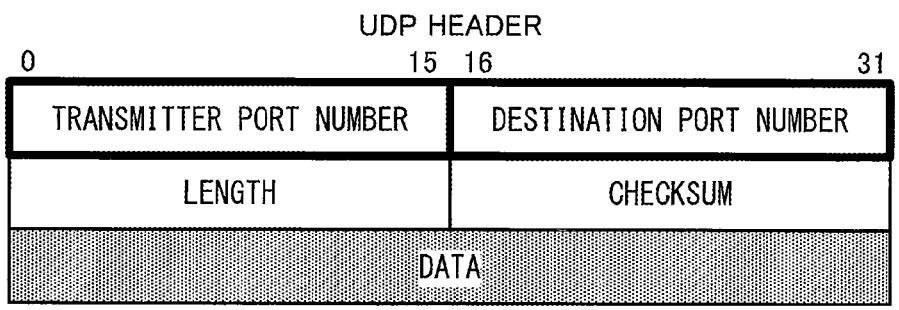

FIGS. 5A to 5C depict examples of headers included in packets. FIG. 5A depicts an IP header, FIG. 5B depicts a TCP header, and FIG. 5C depicts a UDP header.

The IP header includes protocol, transmitter IP address, and destination IP address fields. The protocol is information for identifying the protocol on a higher level (TCP, UDP, or the like). The transmitter IP address is an IP address of the transmitter apparatus (for example, the work server 400) of a packet. The destination IP address is an IP address of the destination apparatus (for example, the work server 500) of a packet.

The TCP header includes transmitter port number and destination port number fields. The transmitter port number is information corresponding to the application program that processed the packets at the transmitter apparatus of the packets. The destination port number is information corresponding to an application program that is to process the packets at the destination apparatus of the packets.

The UDP header includes transmitter port number and destination port number fields. The contents of the transmitter port number and the destination port number are the same as for the transmitter port number and destination port number in a TCP header.

As one example, when the protocol in the IP header indicates TCP, the input data processing unit 120 identifies a session based on the combination of the protocol in the IP header, the transmitter IP address and destination IP address, and the transmitter port number and the destination port number in the TCP header. When the protocol in the IP header indicates UDP, the input data processing unit 120 identifies a session based on the combination of the protocol in the IP header, the transmitter IP address and destination IP address, and the transmitter port number and the destination port number in the UDP header.

FIG. 6 depicts an example of a compression ratio management table. The compression ratio management table 111 is stored in the storage unit 110. The compression ratio management table 111 is updated by the compression ratio managing unit 140. The compression ratio management table 111 includes protocol, port number, pre-compression size, and post-compression size columns.

The protocol column is used to register a protocol type. The port number column is used to register a port number. When the destination and transmitter port numbers are the same, a single port number may be registered. When the destination and transmitter port numbers differ, the destination port number is registered. However, by registering a combination of both port numbers, it is also possible to manage compression records for combinations a destination and transmitter port numbers. The pre-compression size column is used to register the total of the pre-compression data size. The post-compression size column is used to register the total of the post-compression data size.

For example, information where the protocol is "TCP", the port number is "21", the pre-compression size is "1 GB", and the post-compression size is "200 MB" is registered in the compression ratio management table 111. This indicates that the total size of the pre-compression data corresponding to the port number "21" of the protocol "TCP" is 1 GB (Giga Bytes) and the total size of the post-compression data is 200 MB (Mega Bytes).

The compression ratio can be calculated for each port number based on the information registered in the compression ratio management table 111. The compression ratio is the proportion of the reduction in data due to compression relative to the amount of pre-compression data, i.e., what proportion of the data is reduced by compression. More specifically, compression ratio=(pre-compression size−post-compression size)/pre-compression size, which is then multiplied by one hundred when the ratio is expressed as a percentage.

Figure 7:
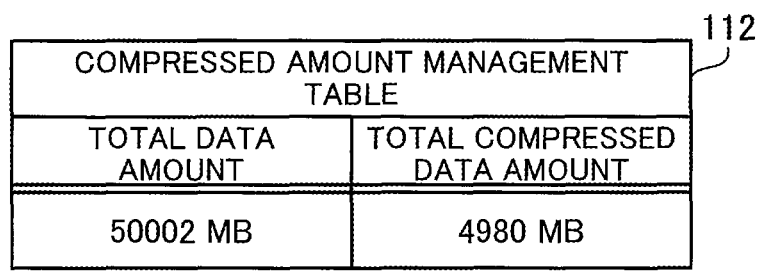
FIG. 7 depicts an example of a compressed amount management table.

FIG. 7 depicts an example of a compressed amount management table. The compressed amount management table 112 is stored in the storage unit 110. The compressed amount management table 112 is updated by the data compressing unit 130. The compressed amount management table 112 includes total data amount and total compressed data amount columns.

The total data amount column is used to register a total amount of data that has been collected. The total compressed data amount column is used to register the total amount of data which has been compressed, out of the amount of data that has been collected. As one example, information where the total data amount is "50002 MB" and the total compressed data amount is "4980 MB" is registered in the compressed amount management table 112. This indicates that the total amount of data collected up to the present is 50002 MB and the total amount of data that has been subjected to compression processing out of such collected data is 4980 MB.

FIG. 8 depicts an example of a compression control table 113. The compression control table 113 is stored in the storage unit 110. The compression control table 113 is used to control the compression processing by the data compressing unit 130. The compression control table 113 is generated in advance by a system manager, for example, and stored in the storage unit 110. The compression control table 113 includes a proportion of data to be compressed, compression ratio threshold, and random compression proportion columns.

The proportion of data to be compressed column is used to register a threshold (referred to as the "first threshold") which is a proportion of the amount of data to be compressed out of the collected amount of data. The compression ratio threshold column is used to register a threshold (referred to as the "second threshold") used when determining whether compression is to be performed. The random compression proportion column is used to register a random compression proportion. The random compression proportion is information for determining sampling timing at which compression is to be attempted for data which according to past compression records is not to be compressed so as to confirm the present compression ratio for such data.

As one example, information where the proportion of data to be compressed is "10%", the "compression ratio threshold" is "50%", and the random compression proportion is "1%" is registered in the compression control table 113. This designates that the amount of data to be compressed is to be 10% of the total amount of data that is collected. When the compression ratio is 50% or higher, i.e., when it is possible to reduce the original size of the data by 50% or more, the decision is taken to perform compression, while when the compression ratio is below 50%, the decision is taken to not perform compression. The information in FIG. 8 also indicates that for data where it has been decided from past records that compression is not to be performed, control that attempts compression with a frequency of once every hundred times data is collected and determines the compression ratio is to be carried out.

FIG. 9 depicts an example of a compression ratio adjustment table. The compression ratio adjustment table 114 is stored in the storage unit 110. The compression ratio adjustment table 114 is used by the compression ratio managing unit 140 to adjust the compression records. The compression ratio adjustment table 114 is generated in advance by the system manager, for example, and is stored in the storage unit 110. The compression ratio adjustment table 114 includes adjustment interval, reduction ratio for total pre-compression size and reduction ratio for compression ratio columns.

The adjustment interval column is used to register a time interval for carrying out adjustment of the compression records. The reduction ratio for total pre-compression size column is used to register a proportion by which the pre-compression size in the compression ratio management table 111 is to be reduced. The reduction ratio for compression ratio column is used to register a proportion by which the compression ratio is to be reduced.

As one example, information where the adjustment interval is "one hour", the reduction ratio for the total pre-compression size is "90%", and the reduction ratio for the compression ratio is "90%" is registered in the compression ratio adjustment table 114. This indicates that the set values in the compression ratio management table 111 are to be adjusted at one hour intervals, with the adjustment multiplying the pre-compression size by 0.9 and the reduction ratio for the compression ratio by 0.9. The compression ratio managing unit 140 uses such information to adjust the registered values of the pre-compression size and the post-compression size in the compression ratio management table 111 (described in detail later).

Figure 10:
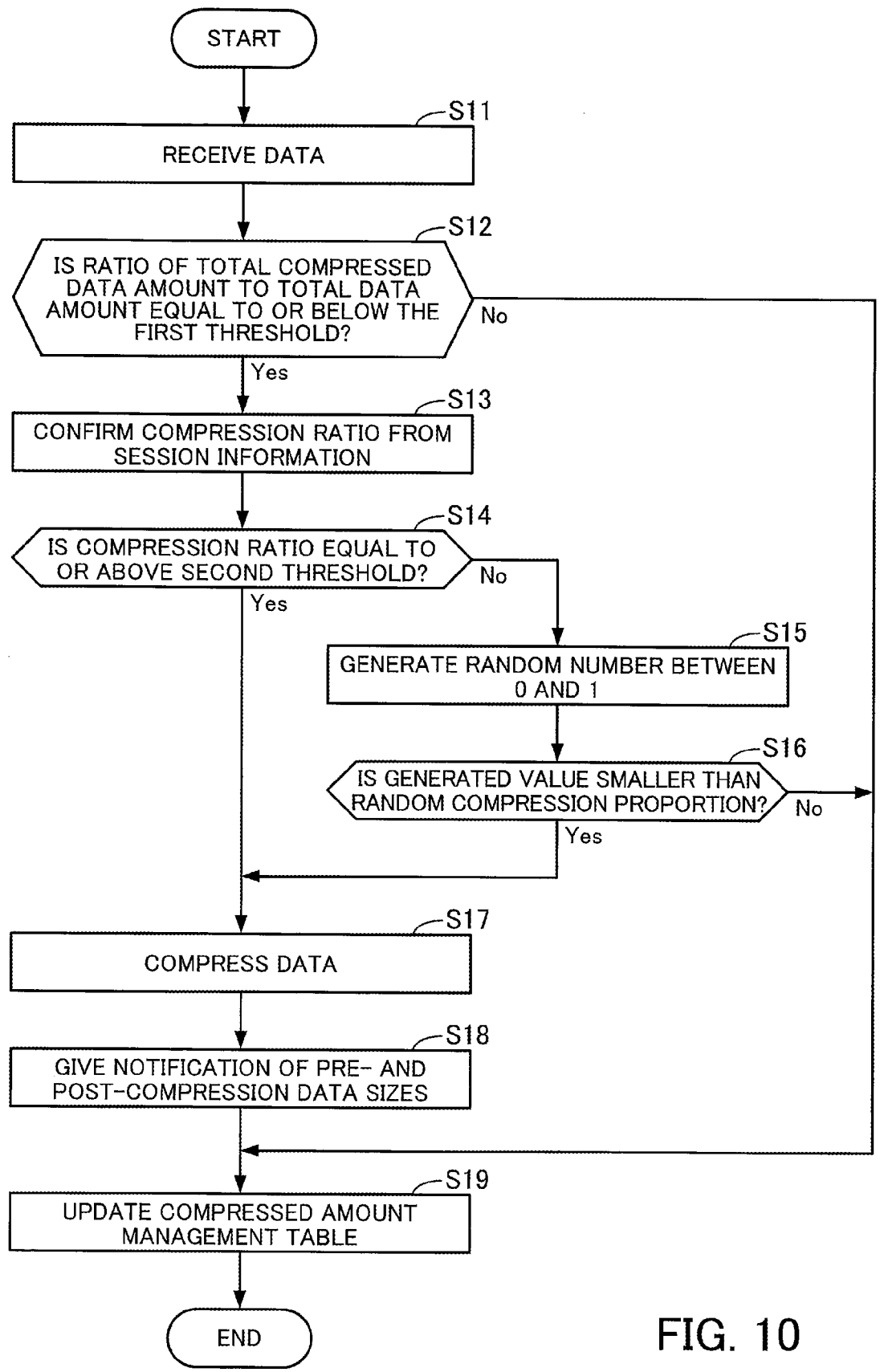
FIG. 10 is a flowchart depicting an example of compression processing.

FIG. 10 is a flowchart depicting an example of compression processing. The processing in FIG. 10 is described below in order of the step numbers.

(S11) The input data processing unit 120 receives data. As described earlier, the data is a group of a plurality of packets to be sorted into sessions. Accordingly, reception of data corresponds to reception of a plurality of packets to be sorted into sessions. The input data processing unit 120 obtains data for each session by sorting the received plurality of packets into sessions.

(S12) The data compressing unit 130 determines, based on the compressed amount management table 112, whether the ratio of the total compressed data amount to the total data amount is equal to or below the first threshold, and if so, the processing proceeds to step S13. If the ratio is above the first threshold, the processing proceeds to step S19. According to the example of the compression control table 113, the first threshold is 10%. According to the example of the compressed amount management table 112, the ratio of the total compressed data amount to the total data amount is (4980 MB÷50002 MB)×100=9.9596%. The ratio 9.9596% is equal to or below the first threshold (10%), and therefore the processing proceeds to step S13.

(S13) The data compressing unit 130 notifies the compression ratio managing unit 140 of the session information and confirms the compression ratio when compression is performed. As described earlier, the session information includes a protocol, transmitter/destination ID address, and transmitter/destination port number (for example, "21"). The data compressing unit 130 acquires the compression ratio for the transmitter/destination port number included in the session information from the compression ratio managing unit 140.

(S14) The data compressing unit 130 determines whether the compression ratio acquired from the compression ratio managing unit 140 is equal to or above the second threshold. When the compression ratio is equal to or above the second threshold, the processing proceeds to step S17. When the compression ratio is below the second threshold, the processing proceeds to step S15. According to the example of the compression control table 113, the second threshold is 50%. According to the example of the compression ratio management table 111, the compression ratio corresponding to the port number "21" is ((1 GB−0.2 GB)/1 GB)× 100=80%. The compression ratio 80% is larger than the second threshold (50%) and therefore when deciding whether to compress data corresponding to the port number "21", the data compressing unit 130 decides to compress the data.

(S15) The data compressing unit 130 generates random numbers between 0 and 1 at intervals of 0.01. A total of 100 random numbers from 0 to 0.99 can be generated.

(S16) The data compressing unit 130 determines whether the value generated in step S15 is smaller than the random compression proportion. When the value is smaller than the random compression proportion, the processing proceeds to step S17. When the value is equal to or larger than the random compression proportion, the processing proceeds to step S19. According to the example of the compression control table 113, the random compression proportion is 1% (=0.01). Accordingly, when the generated value is 0, the data compressing unit 130 determines that the generated value is smaller than the random compression proportion (0.01) and the processing proceeds to step S17. On the other hand, when the generated value is 0.01 or higher, it is determined that the generated value is equal to or larger than the random compression proportion (0.01) and the processing proceeds to step S19.

(S17) The data compressing unit 130 compresses the received data. It is preferable for the compression method to be lossless (i.e., reversible) compression to enable all of the information in packets to be restored. However, it is possible to perform a lossy conversion, such as by performing lossless compression after deleting information that does not need to be stored.

(S18) The data compressing unit 130 notifies the compression ratio managing unit 140 of the pre-compression and post-compression data sizes. Such notification includes the session information.

(S19) The data compressing unit 130 updates the compressed amount management table 112. More specifically, when data was compressed, the data compressing unit 130 adds the pre-compression data size to both the total data amount and the total compressed data amount. On the other hand, when the data was not compressed, the data compressing unit 130 adds the pre-compression data size to only the total data amount.

After this, the metadata adding unit 150 adds metadata to the data processed by the data compressing unit 130 to generate output data. The metadata adding unit 150 acquires the content of the metadata to be added from the data compressing unit 130. The output data processing unit 160 then decides the storage server to which the output data is to be assigned in accordance with the metadata. The output data processing unit 160 transmits the output data to the storage server decided as the assigning destination.

Note that the reason that it is determined in step S12 whether the ratio of the total compressed data amount to the total data amount is equal to or below the first threshold is to suppress the amount of data subjected to compression out of the received data to a certain proportion. As one example, when almost all of the communication is performed using a specified port number, the amount of data to be compressed by the data compressing unit 130 becomes excessive and the compression processing may not be able to keep up. For this reason, by providing the first threshold, the amount of data to be compressed is prevented from becoming excessive. However, in situations where communication is performed using a plurality of port numbers without heavy usage of the same port numbers, the determination in step S12 does not need to be made (i.e., after step S11, it is possible to skip step S12 and execute step S13).

It is determined once again in step S15 and S16 whether data is to be compressed because there is the possibility, even when the compression ratio was been calculated based on past compression records as being smaller than the second threshold, that the present compression ratio will have improved due to a change in the communicated content. For this reason, the data compressing unit 130 finds the compression ratio by intermittently compressing packets with a port number set as being uncompressed and changes, in accordance with the change in compression ratio, the packets with such port number to packets to be compressed. By doing so, it is possible to perform control so that even a port number whose data is uncompressed can be newly set as compressed when the communicated content has changed and compression is now expected to be effective.

In addition, in step S13, the data compressing unit 130 is sometimes unable to acquire a compression ratio from the compression ratio managing unit 140. There are cases when a record corresponding to the protocol and/or port number is yet to be registered in the compression ratio management table 111. In such situation, the data compressing unit 130 advances the processing to step S17. As a result, a record corresponding to the protocol and/or port number in question is added to the compression ratio management table 111.

Figure 11:
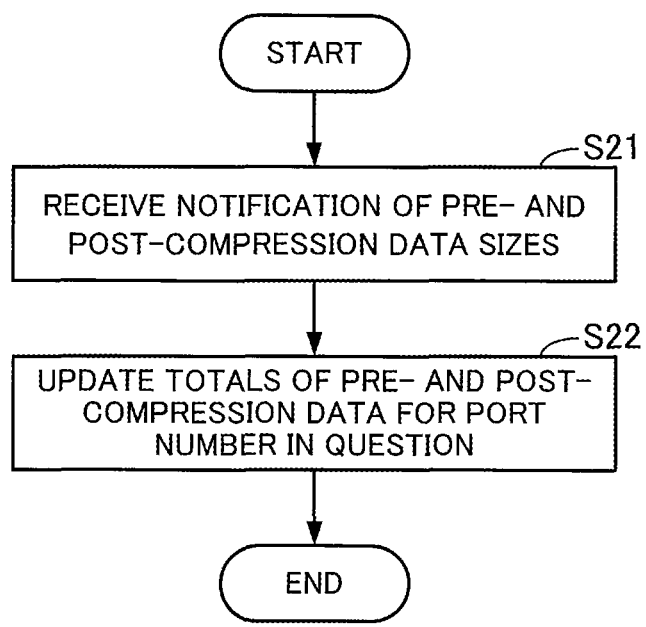
FIG. 11 is a flowchart depicting an example of a compression ratio management process.

FIG. 11 is a flowchart depicting an example of the compression ratio management process. The processing in FIG. 11 is described below in order of the step numbers.

(S21) The compression ratio managing unit 140 receives the notification of the pre- and post-compression data sizes from the data compressing unit 130. Such notification includes session information. Step S21 is a step corresponding to step S18 in FIG. 10.

(S22) The compression ratio managing unit 140 updates the totals of the pre-compression and post-compression data sizes in the compression ratio management table 111. More specifically, the pre-compression data size is added to the registered value of the pre-compression size of the record (identified by the protocol and port number) corresponding to the notified session information. Also, the post-compression data size is added to the registered value of the post-compression size of the same record. As one example, when the protocol "TCP" and the port number "21" are included in the session information, the pre-compression size and the post-compression size of the record corresponding to the protocol "TCP" and the port number "21" are updated.

By doing so, the compression ratio managing unit 140 registers a record of data compression by the data compressing unit 130 for each port number in the compression ratio management table 111. The compression ratio managing unit 140 regularly adjusts the registered values in the compression ratio management table 111. Next, the adjustment procedure will be described.

Figure 12:
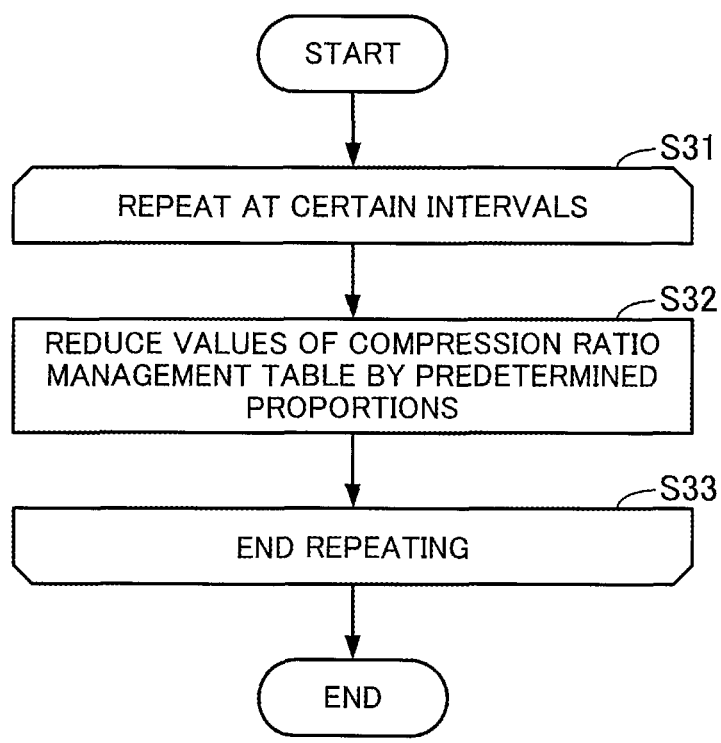
FIG. 12 is a flowchart depicting an example of a compression ratio adjusting process.

FIG. 12 is a flowchart depicting an example of the compression ratio adjusting process. The processing in FIG. 12 is described below in order of the step numbers.

(S31) The compression ratio managing unit 140 repeatedly executes the processing in step S32 at intervals of a certain period. The interval is the adjustment interval registered in the compression ratio adjustment table 114.

(S32) The compression ratio managing unit 140 reduces the registered values in the compression ratio management table 111 by predetermined proportions. More specifically, first the compression ratio managing unit 140 calculates the compression ratio for each record based on the compression ratio management table 111. The compression ratio managing unit 140 then reduces the pre-compression size of all of the records in the compression ratio management table 111 by an amount corresponding to the reduction ratio for the total pre-compression size registered in the compression ratio adjustment table 114. The compression ratio managing unit 140 also uses the reduction ratio for the compression ratio registered in the compression ratio adjustment table 114 to reduce the calculated compression ratio and recalculates the post-compression size of each record. When the reduction ratio for the total pre-compression size is expressed as $\alpha$, the reduction ratio for the compression ratio as $\beta$, the pre-compression size before adjustment registered in the compression ratio management table 111 as a, and the post-compression size before adjustment as b, the post-compression size after adjustment x is expressed as Equation (1).

$$x = \alpha \times a \times \left\{1 - \beta \times \left(1 - \frac{b}{a}\right)\right\} \quad (1)$$

(S33) When the collecting of packets by the capture server 100 has ended, the compression ratio managing unit 140 ends the repeated processing and ends the compression ratio adjusting process.

In this way, since it is conceivable for the compression ratio to vary between time zones, the compression ratio managing unit 140 carries out adjustment by multiplying all of the registered values in the compression ratio management table 111 by a constant at intervals of a certain period to cause decay in the compression ratio. According to the example of the compression ratio adjustment table 114, the total of the pre-compression size is reduced by 10% every hour and the total of the post-compression size is also adjusted so that the compression ratio also falls by 10%.

FIG. 13 depicts an example where decay is caused in the compression ratio. As one example, assume that at certain timing, the pre-compression size of a certain record in the compression ratio management table 111 is 100 and that the post-compression size is 80. The compression ratio at such timing is 20%. After this, when it is assumed that there will be no addition to the pre-compression size and the post-compression size, the compression ratio managing unit 140 adjusts the post-compression size as indicated below using to Equation (1) above. Here, as one example, it is assumed that $\alpha=\beta=0.9$.

One hour later, the pre-compression size is adjusted to 90, and since the compression ratio becomes 18%, the post-compression size is adjusted to 74. Two hours later, the pre-compression size is adjusted to 81, and since the compression ratio becomes 16%, the post-compression size is adjusted to 68. Three hours later, the pre-compression size is adjusted to 73, and since the compression ratio becomes 15%, the post-compression size is adjusted to 62. After this, the compression ratio managing unit 140 continues to adjust the post-compression size in the same way.

As depicted in FIGS. 12 and 13, the reason the registered values in the compression ratio management table 111 are reduced is to reduce the influence of past communication trends. That is, so long as the total values of the pre- and post-compression sizes are held, the past will continue to have an influence. In such situation, there is a risk of past trends that differ to the present communication trend continuing to be reflected in the total values. By regularly reducing the registered values in the compression ratio management table 111, the influence of the past is reduced and the compression ratio of the present trend can be calculated more appropriately. Note that the adjustment interval and the values of $\alpha$ and $\beta$ given here are examples that can be changed in accordance with operation.

In this way, by deciding whether data is to be compressed or uncompressed when data is stored in accordance with the port number included in the collected data, the capture server 100 compresses data whose compression ratio is favorable and does not compress data whose compression ratio is poor. This is because compressing data whose compression ratio is poor would contribute little to saving on the storage capacity of the storage apparatuses 300, 300a, and 300b. By doing so, it is possible to efficiently reduce the load of the compression processing. As a result, it is possible to reduce the load of the capture server 100 and to save on the storage capacity used to store data while avoiding the dropping of data.

However, the application programs that correspond to port numbers include programs that transmit data in a variety of formats. Such application programs may repeatedly transmit data of the same format in keeping with the destination or transmitter apparatus, so that even if the port number is the same, it is conceivable for the compression ratio of data to differ according to the destination and/or transmitter apparatus. As one example, although a given client computer may mainly receive video content distributed by a Web server (using the port number "80", for example), another client computer may mainly receive text content distributed by the Web server (using the same port number "80", for example). In such case, it is preferable to select the data to be compressed so as to distinguish between the destination or transmitter apparatus. For this reason, the capture server 100 may manage additional information in the compression ratio management table 111.

FIG. 14 depicts another example ("first alternative example") of a compression ratio management table. The compression ratio management table 111a is stored in the storage unit 110 in place of the compression ratio management table 111. The compression ratio management table 111a differs to the compression ratio management table 111 in that it is possible to also record the destination IP address in addition to the information registered in the compression ratio management table 111. The destination IP address of received packets is registered in the destination IP address column.

As one example, information where the protocol is "TCP", the port number is "80", the destination IP address is "192.168.1.100", the pre-compression size is "100 MB" and the post-compression size is "20 MB" is registered in the compression ratio management table 111a. This indicates that the total of the pre-compression size of data corresponding to the protocol "TCP", the port number "80", and the destination IP address "192.168.1.100" is 100 MB and the total of the post-compression size is 20 MB.

In this way, it is possible for the compression ratio managing unit 140 to record compression records while distinguishing between IP addresses, even for the same port number. By doing so, it is possible to manage the compression records and acquire the compression ratio of data in accordance with the trend of the communicated content for each apparatus.

Note that although the destination IP address is recorded in the example described above, it is possible to record the transmitter IP address. It is also possible to record both the destination IP address and the transmitter IP address.

When the compression ratio management table 111a is used, in step S13 in FIG. 10, the compression ratio managing unit 140 provides a compression ratio corresponding to the protocol, destination IP address, and port number to the data compressing unit 130. The data compressing unit 130 decides whether to compress data in accordance with such compression ratio. Also, in step S22 in FIG. 11, the compression ratio managing unit 140 records the total pre-compression and post-compression data sizes in a record identified by the protocol, destination IP address, and port number.

In this way the compression ratio managing unit 140 is capable of recording compression records while distinguishing between data according to the destination IP address, even for the same port number. By doing so, it is possible to manage communication records in accordance with the apparatuses performing communication in addition to the port numbers and possible to acquire a compression ratio in keeping with the trend in the communicated content for each apparatus performing communication. As a result, it is possible to more precisely select data for which compression is expected to have a large effect, and to further reduce the load of the compression processing.

FIG. 15 depicts yet another example ("second alternative example") of a compression ratio management table. The compression ratio management table 111b is stored in the storage unit 110 in place of the compression ratio management table 111. The compression ratio management table 111b differs to the compression ratio management table 111 in that it is possible to also record the file type in addition to the information registered in the compression ratio management table 111. The format of data (or "file type") is registered in the file type column. When the file type is unclear, "unclear" is registered in the file type column.

As one example, information where the protocol is "TCP", the port number is "80", the file type is "video/mpeg", the pre-compression size is "100 GB", and the post-compression size is "97 GB" is registered in the compression ratio management table 111b. This indicates that the total of the pre-compression size of data corresponding to the protocol "TCP", the port number "80", and the file type "video/mpeg" is 100 GB and the total of the post-compression size is 97 GB.

When the compression ratio management table 111b is used, in step S13 in FIG. 10, the compression ratio managing unit 140 provides a compression ratio corresponding to the protocol, port number, and file type to the data compressing unit 130. The data compressing unit 130 decides whether to compress data in accordance with such compression ratio. Also, in step S22 in FIG. 11, the compression ratio managing unit 140 records the total pre-compression and post-compression data sizes in a record identified by the protocol, port number, and file type.

In this way, the compression ratio managing unit 140 is capable of analyzing the content of the collected packets and recording compression records while distinguishing between data according to file type, even for the same port number. By doing so, it is possible to manage communication records separately for file types for each port number and possible to acquire a compression ratio for data. As a result, it is possible to more precisely select data for which compression is expected to have a large effect, and to further reduce the load of the compression processing.

Note that although metadata is added to the data after compression in this second embodiment, it is also possible to compress the data after the metadata has been added. In such case, the data compressing unit 130 may compress the part aside from the metadata and leave the metadata part uncompressed.

Third Embodiment

A third embodiment is described below. The description mainly focuses on differences with the second embodiment described above and description of common features is omitted.

The trend in the communicated content for each port number may change between time zones (such as the time of day). For this reason, in this third embodiment, a communication record is recorded separately in each time zone for each port number and is used to select the data to be compressed.

Here, the communication recording system according to the third embodiment is the same as the communication recording system according to the second embodiment depicted in FIG. 2. The elements included in the communication recording system according to the third embodiment are indicated using the same names and reference numerals as in the second embodiment. However, the third embodiment differs to the second embodiment by recording a communication record separately in each time zone for each port number.

FIG. 16 depicts an example of a compression ratio management table according to the third embodiment. This compression ratio management table 111c is stored in the storage unit 110 in place of the compression ratio management table 111. The compression ratio management table 111c differs to the compression ratio management table 111 in that a combination of the pre-compression size and post-compression size can be recorded separately for each time zone.

In the compression ratio management table 111c, a pre-compression size and post-compression size are recorded for every hour in a day. Although the length of one time zone is set as one hour in this example, a different length such as two hours or three hours may be used.

As one example, information where the protocol is "TCP", the port number is "21", the pre-compression size for 00:00 to 00:59 is "200 MB", the post-compression size for 00:00 to 00:59 is "40 MB", the pre-compression size for 01:00 to 01:59 is "100 MB", the post-compression size for 01:00 to 01:59 is "30 MB", the pre-compression size for 02:00 to 02:59 is "100 MB", and the post-compression size at 02:00 to 02:59 is "25 MB" is registered in the compression ratio management table 111c. This indicates that the total of the pre-compression size of data corresponding to the protocol "TCP" and the port number "21" for 00:00 to 00:59 is 200 MB and the total of the post-compression size is 40 MB. This also indicates that the total of the pre-compression size for 01:00 to 01:59 is 100 MB and the total of the post-compression size is 30 MB. This also indicates that the total of the pre-compression size for 02:00 to 02:59 is 100 MB and the total of the post-compression size is 25 MB.

When the compression ratio management table 111c is used, the compression ratio managing unit 140 provides the compression ratio corresponding to the present time zone in response to an enquiry into the compression ratio from the data compressing unit 130 (step S13 in FIG. 10). The data compressing unit 130 uses the compression ratio corresponding to the present time zone when making the determination in step S14 in FIG. 10. In the third embodiment, the compression ratio managing process illustrated in FIG. 11 is performed as follows.

Figure 17:
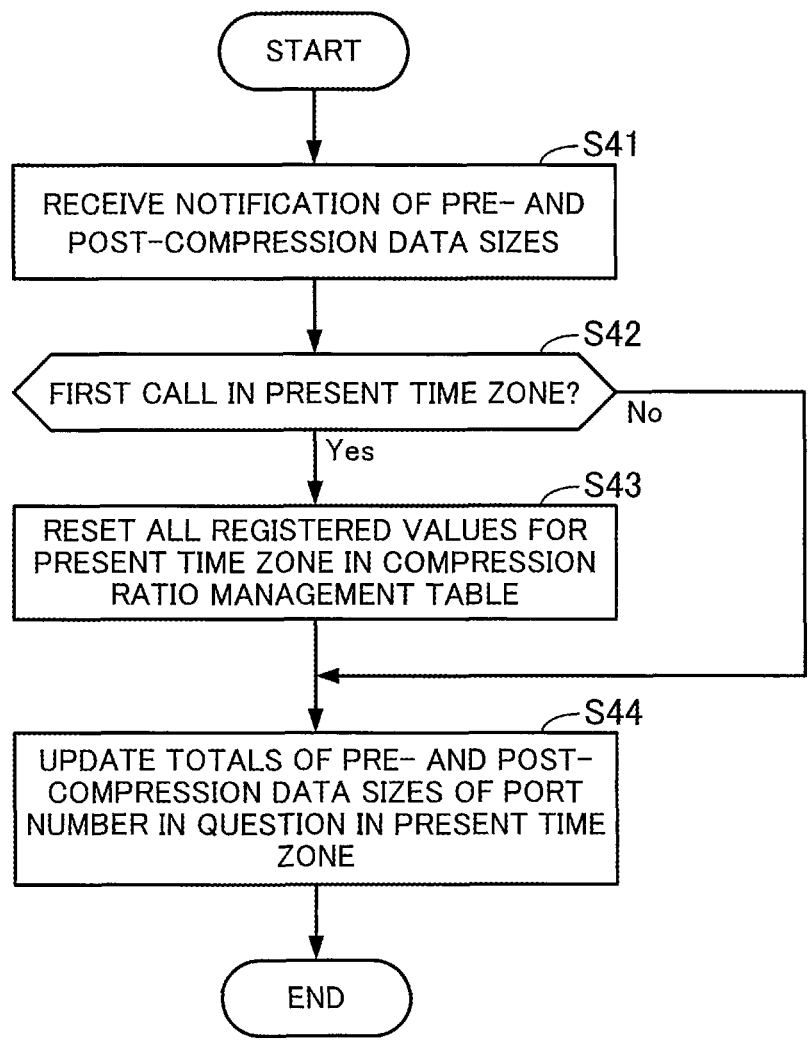
FIG. 17 is a flowchart depicting an example of a compression ratio managing process according to the third embodiment.

FIG. 17 is a flowchart depicting an example of the compression ratio managing process according to the third embodiment. The processing in FIG. 17 is described below in order of the step numbers.

(S41) The compression ratio managing unit 140 receives notification of the pre-compression and post-compression data sizes from the data compressing unit 130. This notification also includes session information. Step S41 corresponds to step S18 in FIG. 10.

(S42) The compression ratio managing unit 140 determines whether present call is the first call in the present time zone. When the call is the first call in the present time zone, the processing proceeds to step S43. When the call is not the first call, the processing proceeds to step S44.

(S43) The compression ratio managing unit 140 resets all of the registered values of the present time zone in the compression ratio management table 111c. That is, the compression ratio managing unit 140 resets the registered values of the present time zone for all of the port numbers to zero. As one example, if the present time zone is 00:00 to 00:59, the registered values of all of the pre-compression size and the post-compression size for 0:00 to 0:59 in the compression ratio management table 111c are reset to zero.

(S44) The compression ratio managing unit 140 updates the total pre-compression and post-compression data sizes in the compression ratio management table 111c. More specifically, the pre-compression data-size is added to the registered value of the pre-compression size of the present time zone in the record corresponding to the notified session information. Also, the post-compression data size is added to the registered value of the post-compression size of the present time zone of the same record. As one example, when the protocol "TCP" and the port number "21" are included in the session information and the present time zone is 00:00 to 00:59, the pre-compression size and the post-compression size for 0:00 to 0:59 in the record corresponding to the protocol "TCP" and the port number "21" are updated.

In this way, the capture server 100 manages compression records for each time zone and selects whether to compress data in accordance with the compression ratio for each time zone. By doing so, it is possible to select data for which compression has a large effect in reducing the data size in accordance with changes in the trend of the types of data transmitted and received in a time zone. Note that in the third embodiment, as illustrated in FIG. 17, since the registered values of a time zone are reset every time such time zone commences, the compression ratio adjusting process illustrated in FIG. 12 does not need to be performed.

Fourth Embodiment

A fourth embodiment is described below. The description mainly focuses on differences with the second and third embodiments described above and description of common features is omitted.

Although data is compressed by the capture server 100 in the second and third embodiments, a data compression function may be provided in the storage servers 200, 200a, and 200b. For this reason, in the fourth embodiment, the function that performs data compression is provided by the storage servers 200, 200a, and 200b.

The communication recording system according to the fourth embodiment is the same as the communication recording system according to the second embodiment depicted in FIG. 2. The elements included in the communication recording system according to the fourth embodiment are indicated using the same names and reference numerals as in the second embodiment. However, the fourth embodiment differs to the second embodiment in that the functions of the data compressing unit 130 and the compression ratio managing unit 140 are provided not in the capture server 100 but in the storage servers 200, 200a, and 200b. That is, in the fourth embodiment, the capture server 100 sorts packets into sessions, adds metadata, and transmits the packets uncompressed to the storage servers 200, 200a, and 200b.

Figure 18:
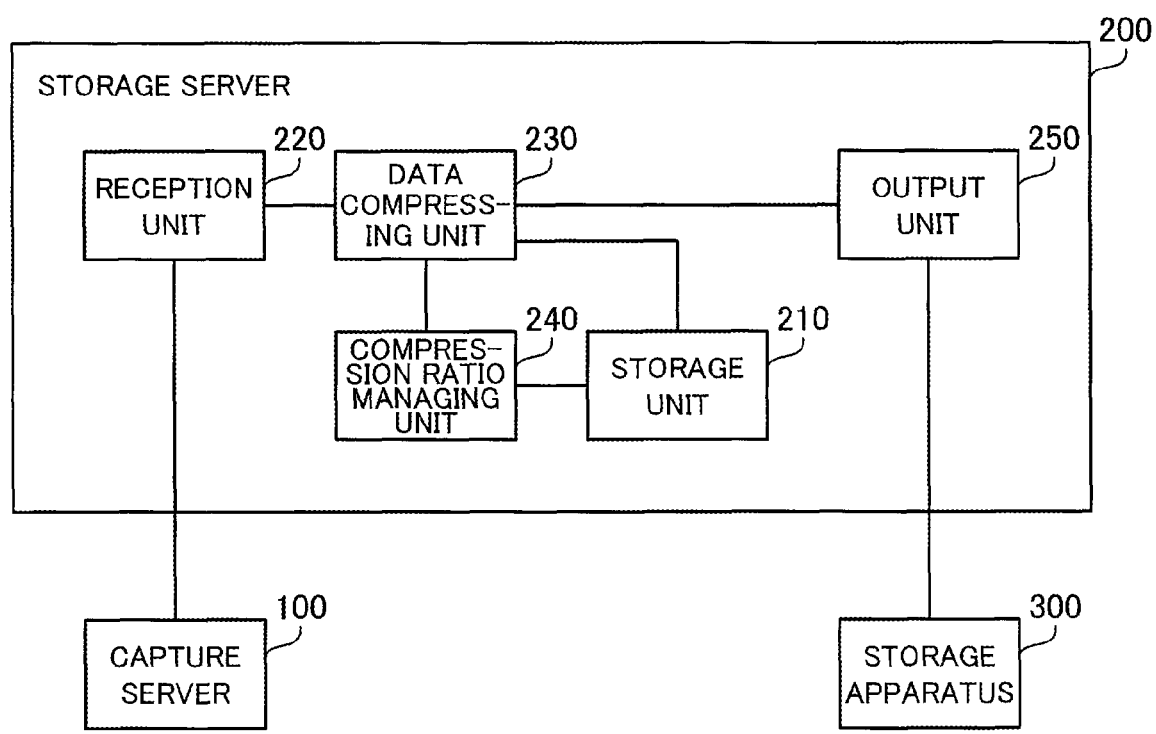
FIG. 18 depicts example functions of a storage server according to a fourth embodiment.

FIG. 18 depicts example functions of a storage server according to the fourth embodiment. The storage server 200 includes a storage unit 210, a reception unit 220, a data compressing unit 230, a compression ratio managing unit 240, and an output unit 250. The storage unit 210 is realized by a storage region reserved in a RAM, HDD, or the like included in the storage server 200. The reception unit 220, the data compressing unit 230, the compression ratio managing unit 240, and the output unit 250 are realized by a processor included in the storage server 200 executing programs stored in a RAM. The storage servers 200a and 200b have the same functions as the storage server 200.

The storage unit 210 stores the compression ratio management table 111, the compressed amount management table 112, the compression control table 113, and the compression ratio adjustment table 114.

The reception unit 220 receives data from the capture server 100. As described earlier, such data includes data where a plurality of packets received from the capture server 100 are gathered into a predetermined size for each session (data joining a plurality of packets) and includes metadata that has been added by the capture server 100.

The data compressing unit 230 acquires packets included in the data received by the reception unit 220 or session information from the metadata included in the packets. The data compressing unit 230 enquires to the compression ratio managing unit 240 about the compression ratio when the data received by the reception unit 220 is compressed. When such enquiry is made, the data compressing unit 230 informs the compression ratio managing unit 240 of the session information of the data.

The data compressing unit 230 decides whether the data in question is to be compressed in keeping with the compression ratio received in reply from the compression ratio managing unit 240. When the data is to be compressed, the data compressing unit 230 compresses the data (i.e., the part aside from the metadata). When the data is not to be compressed, the data compressing unit 230 leaves the data uncompressed. The data compressing unit 230 updates the compressed amount management table 112 stored in the storage unit 210 (i.e., updates the total data amount and total compressed data amount).

The compression ratio managing unit 240 manages records of data compression by the data compressing unit 230. When compression processing has been performed by the data compressing unit 230, the compression ratio managing unit 240 acquires the session information of the data that has been compressed, the pre-compression data size, and the post-compression data size from the data compressing unit 230. The compression ratio managing unit 240 updates the compression ratio management table 111 stored in the storage unit 210 using the acquired information (i.e., updates the totals of the pre-compression size and the post-compression size).

The output unit 250 stores the data (which may be compressed or uncompressed) acquired from the data compressing unit 230 in the storage apparatus 300.

In this way, the data compressing unit 230 and the compression ratio managing unit 240 may be provided in the storage server 200. With such configuration, the procedure of the data compressing unit 130 illustrated in FIG. 10 is executed by the data compressing unit 230. The procedure of the compression ratio managing unit 140 illustrated in FIGS. 11 and 12 is executed by the compression ratio managing unit 240.

By doing so, it is possible to efficiently reduce the load of the compression processing in the same way as the second embodiment. The compression ratio managing unit 240 may manage the compression records by storing one of the compression ratio management tables 111a, 111b, and 111c in the storage unit 210 in place of the compression ratio management table 111. By doing so, it is possible to sort the data that is candidates for compression more precisely according to file type and/or time zone and to select data for which the compression effect is large.

Note that the information processing in the first embodiment can be realized by having the computational unit 1b execute a program. The information processing in the second and third embodiments can be realized by having the processor 101 execute a program. The information processing in the fourth embodiment can be realized by having a processor provided in the storage server 200 execute a program. The program can be recorded in the recording medium 14 that is computer-readable.

As one example, the program can be distributed by distributing the recording medium 14 on which the program is recorded. The program may also be stored in another computer and distributed via a network. As one example, the computer may store (install) a program recorded on the recording medium 14 or a program received from another computer in a storage apparatus such as the RAM 102 or the HDD 103 and then read out and execute the program from the storage apparatus.

According to the above embodiments, the load of the compression processing is efficiently reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A communication recording apparatus comprising:
a memory that stores packets transmitted from a transmitter apparatus to a destination apparatus; and
a processor that executes a process including deciding, in accordance with a port number included in the received packets, whether the packets are to be compressed, compressing the packets decided to be compressed, and storing the compressed packets in the memory,
the processor intermittently compresses packets with a port number whose packets are not to be compressed, calculates a compression ratio, and changes whether packets are to be compressed for the port number in accordance with changes in the compression ratio.

2. The communication recording apparatus according to claim 1, wherein the processor calculates a compression ratio for each port number from a compression record for the packets and decides whether to compress the packets in accordance with the compression ratio for each port number.

3. The communication recording apparatus according to claim 2, wherein the processor calculates the compression ratio for a port number and a destination address included in the packets and decides whether to compress the packets in accordance with the compression ratio for the port number and the destination address.

4. The communication recording apparatus according to claim 2, wherein the processor calculates the compression ratio in accordance with a port number included in the packets and a data format of data in the packets and decides whether to compress the packets in accordance with the compression ratio for the port number and the data format.

5. The communication recording apparatus according to claim 2, wherein the processor calculates the compression ratio for each port number separately for time zones and decides whether to compress packets in accordance with the compression ratio for a present time zone and the port number.

6. The communication recording apparatus according to claim 2, wherein the processor records a total of a pre-compression size and a total of a post-compression size for each port number as the compression record and reduces the total of the pre-compression size and the total of the post-compression size with a predetermined cycle.

7. The communication recording apparatus according to claim 2, wherein the processor decides to compress the packets when a proportion of a data size reduced by compression relative to the pre-compression data size is at least equal to a threshold and to not compress the packets when the proportion is smaller than the threshold.

8. The communication recording apparatus according to claim 1, wherein the processor compresses the packets when a total size of the compressed packets out of a total size of the stored packets has not reached a predetermined proportion.

9. A non-transitory computer-readable storage medium storing a communication recording program that causes a computer to perform a procedure comprising:
deciding, in accordance with a port number included in packets that have been received, whether the packets are to be compressed, and compressing the packets decided to be compressed and storing the compressed packets in a memory, the procedure further includes intermittently compressing packets with a port number whose packets are not to be compressed, calculating a compression ratio, and changing whether packets are to be compressed for the port number in accordance with changes in the compression ratio.

10. A communication recording method comprising:

deciding, in accordance with a port number included in packets that have been received, whether the packets are to be compressed, and compressing the packets decided to be compressed and storing the compressed packets in a memory, the method further includes intermittently compressing packets with a port number whose packets are not to be compressed, calculating a compression ratio, and changing whether packets are to be compressed for the port number in accordance with changes in the compression ratio.

* * * * *